April 7, 1953 — R. R. WEBB — 2,633,850

FOLDING SUPPORT FOR FILING DEVICES

Filed Sept. 3, 1948 — 2 SHEETS—SHEET 1

ROBERT R. WEBB,
INVENTOR.

BY *Lyon & Lyon*

ATTORNEYS.

April 7, 1953        R. R. WEBB        2,633,850
FOLDING SUPPORT FOR FILING DEVICES
Filed Sept. 3, 1948        2 SHEETS—SHEET 2
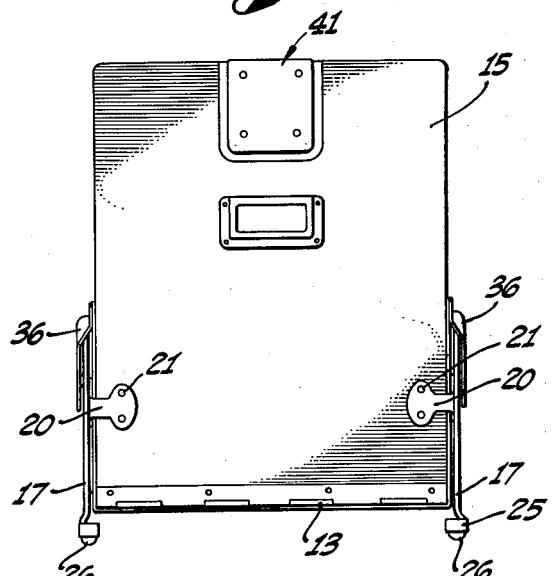
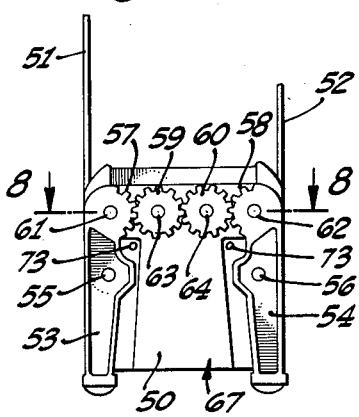
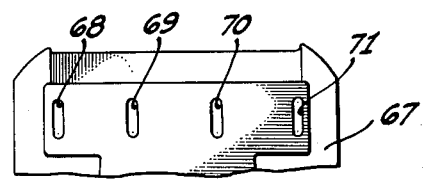
ROBERT R. WEBB,
INVENTOR.
BY Lyon & Lyon
ATTORNEYS.

Patented Apr. 7, 1953

2,633,850

UNITED STATES PATENT OFFICE 2,633,850

FOLDING SUPPORT FOR FILING DEVICES

Robert R. Webb, Los Angeles, Calif., assignor to Charles R. Hadley Company, Los Angeles, Calif., a corporation of California Application September 3, 1948, Serial No. 47,601

8 Claims. (Cl. 129—43)

This invention relates to filing or accounting devices and is particularly directed to improvements in folding leg structure or supports for accounting trays, filing devices, posting units, and the like.

The principal object of this invention is to provide improvements over the folding leg structure disclosed in my application for Accounting Tray, filed April 9, 1945, Serial No. 587,403, now Patent No. 2,463,131, issued March 1, 1949.

More specifically, it is an object of my invention to provide retractable supporting legs for an accounting tray, filing device or the like, which legs are geared together for positive operation between extended and retracted positions when the front and rear plates of the device are pivoted between open and closed positions.

Another object is to provide a construction employing idler gears meshing together and with gearing on the supporting legs so that the legs of each cooperating pair may be spaced further apart without increasing the size of the gearing.

A further object is to provide a retractible supporting leg structure for accounting or filing devices which occupies a minimum of space and which is of simple, rugged construction not apt to get out of order, and which may be economically produced on a quantity basis.

Other objects and advantages will appear hereinafter.

In the drawings:

Figure 5 is a front elevation of the device in closed position.

Figure 6 is a sectional detail taken substantially on the lines 6—6 as shown in Figure 3.

Figure 7 is an end view similar to Figure 3 showing a modified form of my device employing idler gears between the pairs of supporting legs.

Figure 8 is a sectional view taken substantially on the lines 8—8 as shown in Figure 7.

Figure 9 is an end view partly broken away showing a portion of the upstanding end wall of the device shown in Figures 7 and 8.

Figure 1:
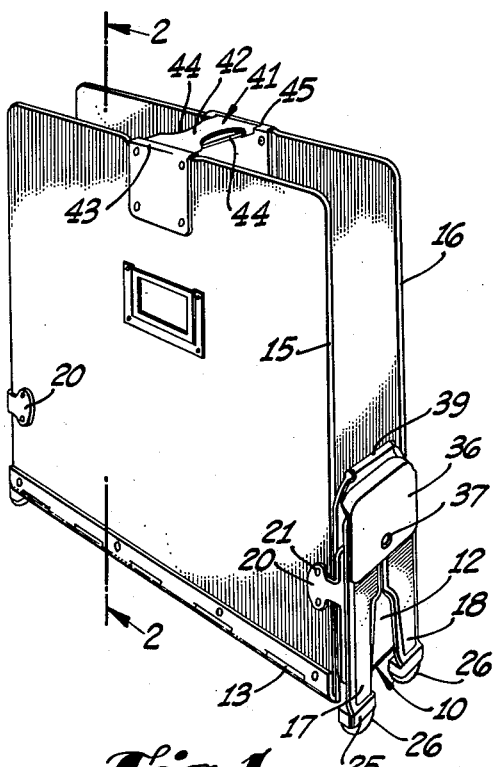
Figure 1 is a perspective view showing a preferred embodiment of my invention.

Referring to the drawings, a frame 10 includes a horizontal base 11 having upstanding end walls 12 at its opposed ends. Piano hinges 13 and 14 extend horizontally along the parallel edges of the base 11 and serve as pivotal connections to support the front and rear plates 15 and 16 of the device respectively.

A folding support structure is provided at each end of the base 11 for limiting the extent of pivotal movement of the front and rear plates 15 and 16 and for providing additional support to prevent the device from overturning when in open position. As shown in the drawings, these supporting means each include a pair of legs 17, 18 pivotally connected to the front and rear plates 15 and 16 respectively. The leg 17 is connected by pivot pin 19 to angle bracket 20 which is fixed to the front plate 15 by means of the rivets 21. Similarly, the leg 18 is connected by pivot pin 22 to the angle bracket 23 which is fixed to the rear plate 16 by means of rivets 24. Each of the legs may be stamped from a single sheet of material and each may be provided with a footpiece 25 for attaching a rubber-like bumper 26.

A spur gear segment 27 stamped on the leg 17 is adapted to mesh with a duplicate gear segment 28 stamped on the leg 18. A pivot pin 29 positioned at the center of the gear segment 27 extends through a vertical slot 30 in the end member 12 and also extends through an aperture in a keeper bar or crosshead 31 positioned on the inside surface of the upstanding end member 12. As shown in Figure 6 the end member 12 may be offset at 32 so that the inner surface 33 of the crosshead lies in the same vertical plane with the inner surface of the end member 12. The offset 32 thus provides a pocket for reception of the crosshead 31. In a similar manner, the pivot pin 34 is mounted at the center of the gear segment 28 and connects the leg 18 with the crosshead 31 extending through slot 35 in the end member 12. A cover plate 36 may be secured in position to cover the gearings 27 and 28 and may be secured by a rivet 37 passing through aperture 38 in the end member 12. A lip 39 on the cover plate is adapted to extend over the extreme upper end 40 on the member 12. Since the retractible supporting leg structure is substantially identical for both ends of the unit, it is deemed unnecessary to describe both in detail.

Figure 4:
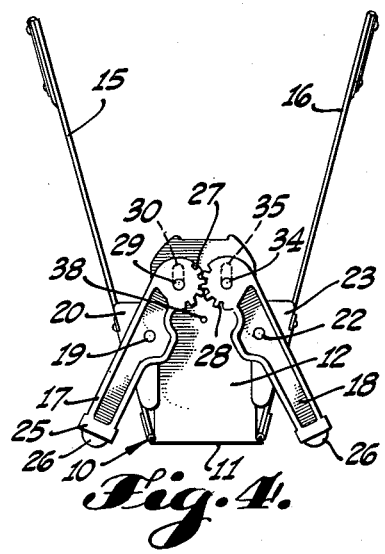
Figure 4 is a view similar to Figure 3 showing the device in open position.

A releasable latch assembly generally designated 41 may be provided at a central position on the extreme upper edges of the front and rear plates 15 and 16. This latch assembly may be of any convenient or desirable type, and as shown includes a swinging bar 42 pivotally mounted at 43 on the front plate 15. Latching lugs 44 are recessed in the bar for horizontal swinging movement and are adapted to engage cooperating abutments 45 on the upper end of the gear plate 16. Spring means (not shown) maintain the latching parts 44 and 45 in engagement. The lugs 44 may be unlatched by exerting horizontal squeezing pressure on them at their exposed locations intermediate the length of the bar 42. When the latch 41 connecting the upper ends of the plates 15 and 16 is disconnected the plates may be pivoted about the hinges 13 and 14 and swung from the closed position shown in Figure 1 to the open position shown in Figure 4 and shown by the dotted lines in Figure 2. Such movement of the front and rear plates 15 and 16 causes the supporting legs 17 and 18 to move outwardly to provide support for the device against overturning.

During pivotal movement of the plates 15 and 16 towards open position the legs 17 and 18 pivot about their respective pivot pins 19 and 22 and uniform positive motion is effected through action of the meshing gear segments 27 and 28. As the feet 17 and 18 move from the retracted position shown in Figure 1 to the extended position shown in Figure 4, the pins 29 and 34 move downwardly in the slots 30 and 35 respectively and the crosshead 31 moves downwardly within the pocket on the backface of the upstanding end member 12. Thus, it is only necessary for the user of the device to spread the front and rear plates apart in order that the legs may be automatically spread to their supporting position. The construction including the meshing gear segments and crosshead connection affords sturdiness and promotes freedom from lost motion or wobble when the legs are in their extended position.

Figure 2:
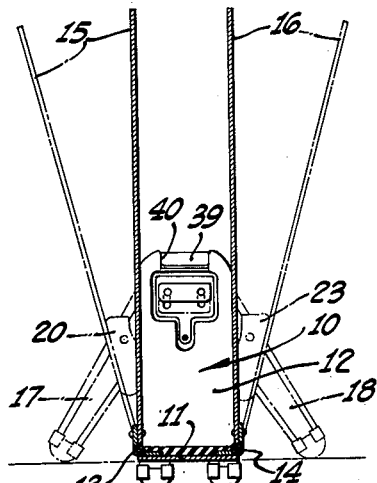
Figure 2 is a sectional elevation taken substantially on the lines 2—2 as shown in Figure 1.
Figure 3:
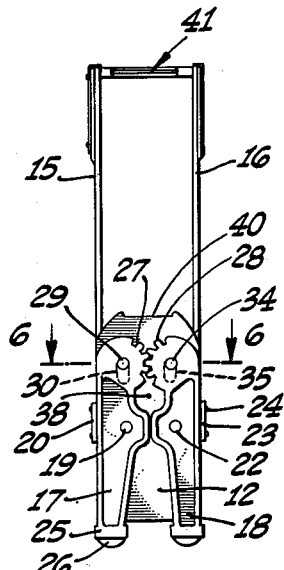
Figure 3 is an end elevation showing the device in closed position, the cover plate being removed to show the meshing of the gear teeth on the supporting legs.

When the device is in its closed position as illustrated in Figure 1, the supporting legs 17 and 18 lie within the planes of the front and rear plates 15 and 16 so that the device may conveniently be stored and may take up a minimum of space. When the front and rear plates are in open position the contents of the device are available for inspection, posting, etc. and the device is well supported against overturning.

In that form of my invention shown in Figures 7 to 9 the width of the base 50 is considerably greater than that previously described. The front and rear plates 51 and 52 are hinged to the base 50 in substantially the same manner as that described above, and the supporting feet 53 and 54 are constructed and pivotally connected to the plates substantially as described. The pivotal supports 55 and 56 are spread apart so far, however, that the gear segments 57 and 58 do not intermesh directly but are connected by means of intermeshing idler gears 59 and 60. As shown in Figure 8 the pivot pins 61 and 62 for the supporting legs 53 and 54, as well as the pivot pins 63 and 64 for the idler gears 59 and 60, each connect to a single keeper bar or crosshead 65 mounted for vertical movement within the pocket 66 formed on the backside of the upstanding end member 67. The pivot pins 61, 62, 63 and 64 extend through vertical slots 68, 69, 70 and 71 respectively in the upstanding end member 67. When the front and rear plates 51 and 52 are tilted toward open position the legs 53 and 54 are tilted from their retracted position to a supporting position in which the legs extend outwardly at an angle from their pivot connections 55 and 56 with the end plates 51 and 52. The gear segment 57 turns in a clockwise direction as viewed in Figure 7, while the gear segment 58 turns in a counterclockwise direction. Accordingly, the idler gear 59 moves counterclockwise while the idler gear 60 moves clockwise. Turning movement of the gear segments 57 and 58 and idler gears 59 and 60 is accomplished by vertical movement of the pivot pins 61, 62, 63 and 64 vertically within the slots 68, 69, 70 and 71 respectively. A cover plate 72 may be connected to the upstanding end member 67 by means of rivets extending through apertures 73.

Having fully described my invention, it is to be understood that I do not wish to be limited to the details herein set forth, but my invention is of the full scope of the appended claims.

I claim:

1. In a device of the class described, the combination of a frame including a base having end walls at either end, the end walls being provided with vertical slots; front and rear plates hinged to the base for movement between parallel closed position and diverging open position; a pair of support legs at each end of the base, each leg being pivotally connected to one of said plates; intermeshing gear means connecting said pairs of legs for dependent movement; crossheads mounted for vertical movement with respect to each of said end walls; pivot pins connecting each of said legs to one of the crossheads and extending through the slots in said end walls, whereby said pairs of legs are caused to diverge as said plates are moved toward open position, so that the lower ends of the legs are spread to form braces to maintain the device against overturning.

2. In a device of the class described, the combination of a frame including a base having upstanding end walls at either end, the end walls being provided with vertical slots; front and rear plates hinged to the base for movement between parallel closed position and diverging open position; a pair of support legs at each end of the base, each pivotally connected to one of said plates; intermeshing gear segments on said legs; a crosshead mounted for vertical movement with respect to each of said upstanding end walls; and pivot pins connecting each of said legs to one of the crossheads and extending through the slots in said upstanding end walls, whereby said pairs of legs are caused to diverge as said plates are moved toward open position, so that the lower ends of the legs are spread to form braces to maintain the device against overturning.

3. In a device of the class described, the combination of a frame including a base having upstanding end walls at either end, the end walls being provided with vertical slots; front and rear plates hinged to the base for movement between parallel closed position and diverging open position; a pair of support legs at each end of the base, each pivotally connected to one of said plates; gear segments on each of said legs; intermeshing idler gears connecting said segments for dependent movement; a crosshead mounted for vertical movement with respect to each of said upstanding end walls; and pivot pins connecting each of said legs and idler gears to one of the crossheads and extending through the slots in said upstanding end walls, whereby said pairs of legs are caused to swing from a retracted position within the confines of the corresponding end wall to an extended position wherein the lower ends of the legs furnish a brace to support the device against overturning as said plates are moved toward open position.

4. In a device of the class described, the combination of a frame including a base having upstanding end walls at either end, the end walls being provided with vertical slots; front and rear plates hinged to the base for movement between parallel closed position and diverging open position; a pair of support legs at each end of the base, each pivotally connected to one of said plates; gear segments on said legs; a crosshead mounted for vertical movement with respect to each of said upstanding end walls; pivot pins connecting each of said legs to one of the crossheads and extending through the slots in said upstanding end walls; and a pair of intermeshing idler gears turnably mounted on the crosshead, each of the idler gears meshing with one of said gear segments, whereby said pairs of legs are caused to swing from a retracted position within the confines of the corresponding end wall to an extended position wherein the lower ends of the legs furnish a brace to support the device against overturning as said plates are moved toward open position.

5. In a device of the class described, the combination of a frame including a base having upstanding end walls at either end, the end walls being provided with vertical slots; front and rear plates hinged to the base for movement between parallel closed position and diverging open position; a pair of support legs at each end of the base, each pivotally connected to one of said plates; a crosshead mounted for vertical movement with respect to each of said upstanding end walls; and pivot pins connecting each of said legs to one of the crossheads and extending through the slots in said upstanding end walls, each leg being movable from a retracted position in which the lower end of the leg is positioned within the confines of the corresponding end wall to an extended position in which the lower end of the leg extends outwardly to contact a supporting surface.

6. A device of the class described, comprising a base; end walls extending upwardly therefrom; side plates hinged to said base between said end walls and adapted to open into diverging position; a pair of supporting legs pivotally connected with said side plates at each end of the base, each end wall having vertical slots in the upper portions thereof; and a vertically movable element on each of said end walls, each pair of legs being connected at their upper ends to one of said elements by pins extending through said slots, each pair of legs being movable between a closed position within the confines of the corresponding end wall and an open position diverging downwardly from said end wall beyond said side plates.

7. An accounting tray or the like, comprising a frame structure including a base; upstanding end walls at the ends of the base, the upstanding end walls being provided with vertical slots; a vertically movable element on each of said end walls; a pair of leg members movable between a retracted position substantially within the vertical boundaries of said end plates and an extended downwardly divergent position with their lower extremities coplanar to support said frame structure; front and rear plates hinged to said base and movable to closed position within the vertical boundaries of said end walls and an open upwardly divergent position; pins extending through said slots pivotally connecting each pair of legs to one of said vertically movable elements; and means pivotally connecting said plates and legs to cause movement of the legs to extended position when the plates are moved to open position.

8. In a filing or accounting device having front and rear plates pivoted relative to a frame for diverging swinging movement about parallel axes, the combination of: a pair of extendible and retractible support legs at each end of the frame, means for pivotally connecting each of the legs to one of the plates for movement about a fixed axis, said means including a pivot pin located between the ends of each of said legs, a gear segment provided on the upper end of each of the legs, a pin defining the axis of rotation of each gear segment, and link means joining said pins to hold the gear segments in mesh and connect each pair of legs for dependent angular movement between a retracted position wherein the lower ends of the legs lie in close proximity to each other to an extended position wherein the legs diverge downwardly and outwardly from said meshing gear segments to brace the device against overturning.

ROBERT R. WEBB.

REFERENCES CITED

The following references are of record in the file of this patent:

UNITED STATES PATENTS

| Number | Name | Date |
|---|---|---|
| 1,681,318 | Banschbach | Aug. 21, 1928 |
| 2,452,687 | Schade | Nov. 2, 1948 |

FOREIGN PATENTS

| Number | Country | Date |
|---|---|---|
| 189,251 | Great Britain | Nov. 30, 1922 |
| 579,728 | Germany | June 30, 1933 |
| 608,781 | Germany | Jan. 31, 1935 |
| 70,920 | Norway | Sept. 2, 1946 |